US006868595B1

(12) United States Patent
Cycholl

(10) Patent No.: US 6,868,595 B1
(45) Date of Patent: Mar. 22, 2005

(54) MULTI-PURPOSE RUB RAIL INSTALLATION TOOL

(75) Inventor: Charles F. Cycholl, Springfield, IL (US)

(73) Assignee: Rubrail Tool, Inc., Springfield, IL (US)

(*) Notice: Subject to any disclaimer, the term of this patent is extended or adjusted under 35 U.S.C. 154(b) by 0 days.

(21) Appl. No.: 10/061,900

(22) Filed: Jan. 31, 2002

Related U.S. Application Data

(60) Continuation-in-part of application No. 09/976,541, filed on Oct. 12, 2001, now Pat. No. 6,523,242, which is a division of application No. 09/482,406, filed on Jan. 12, 2000, now Pat. No. 6,341,410.

(60) Provisional application No. 60/116,165, filed on Jan. 15, 1999.

(51) Int. Cl.$^7$ .................................................. B23P 21/00

(52) U.S. Cl. .......................................................... 29/235

(58) Field of Search ................................ 29/235, 293.5, 29/451, 293.58, 293.57, 238, 290; 404/87, 74; 81/57.19

(56) References Cited

U.S. PATENT DOCUMENTS 3,065,724 A 11/1962 Tritt
3,473,836 A 10/1969 Halter
3,897,967 A 8/1975 Barenyi
4,084,533 A 4/1978 Boyer
4,292,913 A 10/1981 Siebert
4,578,851 A 4/1986 Song
4,903,629 A 2/1990 Maudlin
5,048,170 A * 9/1991 Kuppers ...................... 29/235
5,732,585 A 3/1998 Haushahn
5,758,400 A 6/1998 Miller
5,940,950 A 8/1999 Galat
6,311,378 B1 * 11/2001 Menguc ...................... 29/235
6,341,410 B1 * 1/2002 Armellini et al. ............. 29/235

* cited by examiner

*Primary Examiner*—Robert C. Watson
(74) *Attorney, Agent, or Firm*—Brian S. Steinberger; Law Offices of Brian S. Steinberger, P.A.

(57) ABSTRACT

A multi-purpose automatic handheld installation tool for installing and removing vinyl and plastic resilient bumper inserts into the channels of gunnel rails on the sides of boats, vehicles, motorhomes, trailers, and the like, as well as on the sides of tables, walls and shelves. The tool compresses sides of bumper inserts in order to be easily inserted to the channels of the gunnel rails. A base handle and a secondary handle allow for easy holding of the weight of the tool. The tool handle is oriented to run consistently parallel over the gunnel rails when being used. A guide member allows the tool to follow the path and direction of the gunnel rails, and allows the tool to be consistently maintained at an inclined position and where the handle is substantially parallel overlaying the gunnel rails without having to free-hand support the orientation of the tool. The tool can be powered by a battery or a wall plug power source or pneumatic source. A second embodiment allows the tool be used as a adapter having having a chuck head for attachment and detachment to conventional handheld power tools such as but not limited to power drills, power screw drivers, and the like. Bumper insert material can be removed from the gunnel rail/rub rail by prying up an edge of the insert material feeding it into the wheels of the tool and reversing the installation steps.

20 Claims, 16 Drawing Sheets

MULTI-PURPOSE RUB RAIL INSTALLATION TOOL

This invention relates to moldings, gunnel rails, and the like, and in particular to tools and methods that install, and removes resilient and compressible bumper materials into the rail channels on the sides of boats, vehicles, trailers, motor homes, and the like, and this invention is a Continuation-In-Part of U.S. application Ser. No. 09/976,541 filed Oct. 12, 2001 now U.S. Pat. Ser. No. 6,523,242, which is a Divisional Application of U.S. application Ser. No. 09/482,406, filed Jan. 12, 2000, now issued as U.S. Pat. No. 6,341,410, which claims the benefit of priority to U.S. Provisional Application Ser. No. 60/116,165 filed Jan. 15, 1999.

BACKGROUND AND PRIOR ART

Side moldings, gunnel rails and rub rails have been used over the years on boats to join hulls and decks together, where the gunnel rails have resilient materials inserted within their channels. See for example, U.S. Pat. Nos. 3,065,724 to Tritt; and 4,292,913 to Siebert et al. Other similar bumper assemblies have been proposed for vehicles, docks, and the like, that also use similar expandible resilient material inserts inside of channels. See for example, U.S. Pat. No. 3,473,836 to Halter.

Problems with these assemblies involve the labor, time and equipment that an installer must use to insert the resilient material into the gunnel rail channels. Typically, in the boating industry, an installer has been required to use multiple tools such as screwdrivers, hammer, pliers, hand spade, putty knives, duck-bill pliers, and the like, to jam, bang and push the resilient insert material into the channels. The current installation techniques are both time consuming and expensive projects in labor costs for the installation. These installation techniques cause scrapes, bumps, dents and tears in the insert material. Additionally, the installation tools often damage the channels and the surrounding surfaces on the boats and vehicles.

Under these conventional types of installation methods, the insert material strips often must be heated to soften the material in order for it to be used. The strip materials are generally heated in hot boxes or within hot water tanks. After heating, the strip materials are then installed with the tools described above. Problems occur from these heating techniques. The heating and subsequent cooling of the materials can cause non-uniform shrinkage and inconsistent expansion throughout the strip material within the gunnel rail channels resulting in unsightly bulges and depressions. Furthermore, the installers have received injuries such as damaged hands and other injuries that can and have resulted in workmen's compensation claims through the installation process. The above problems become compounded when the resilient insert materials need to be removed and replaced over time due to natural wear and use.

Over the years various patents have been proposed for the installation of resilient bumpers. For example, U.S. Pat. No. 3,897,967 to Barenyi describes a "protective strip for motor vehicles . . . ", title, that uses resilient bumpers with backings having expandible plug inserts that pass into recesses in the base walls of the channels. However, this reference requires multiple parts and extra tooling of parts that would not be a practical substitute for existing gunnel rails and rub rails on boats, vehicles, and the like.

Other techniques known for inserting resilient bumper strips into channels have included machines. See for example, U.S. Pat. No. 5,758,400 to Miller et al. However, this type of machine would not be a practical alternative for a single user that needs to install the resilient insert bumpers into gunnel rails and rub rails that are already located on the sides of boats, vehicles, and the like. Clearly, this machine would be both expensive in cost and is incapable of being used for already mounted gunnel rails and rub rails.

Various handheld tools have also been proposed for installing resilient bumper type strips. U.S. Pat. No. 4,578,851 to Song describes a handheld tool in various embodiments that requires consistently bending the longitudinal length of the rubber molding into "a curve" that appears to approach up to one hundred eighty degrees in order to fit the rubber molding into the handheld tool. Song '851 mentions that having some resilient strips being "bent too sharply, the molding could break, or the frictional resistance of the molding passing through the tool could make the tool hard to use", column 7, lines 24–27. The embodiments also require having the user physically insert the strip into the initial bent configurations in order to use the tool. Song '851 mentions a power tool version that also requires the user physically bend the resilient strip before running the tool. In addition to having to physically insert the strips, and having to continuously bend the strips, the user will still have to apply some pressure to use the tool as well as having to physically center these tools to be used, and the user will have to maintain a free-hand holding of the tool when being used which would be difficult for large insertion operations.

U.S. Pat. No. 5,940,950 to Galat describes an automated "crimping tool for progressively squeezing weather stripping on an elongated thin molding such as around the border of a vehicle door", abstract. This tool would be difficult to use since it would require the user have to balance the tool in a substantially perpendicular orientation to the strip channel, and the user would have to maintain the position and orientation of the tool in a free-hand application. Additionally, this tool does not allow for the initial easy insertion of the strip into the channels. For example, this tool does not compress the strip for insertion into the channels.

Other techniques have been made but also fail to overcome all of the problems described above. See for example, U.S. Pat. Nos. 4,084,533 to Boyer and 4,903,629 to Mauldin et al. Thus, the need exists for solutions to the above problems.

SUMMARY OF THE INVENTION

The first objective of the present invention is to provide a multipurpose tool and technique to allow a single person the capability of automatically installing and removing resilient bumper insert materials into gunnel rails/rub rails on the sides of boats, vehicles, motorhomes, trailers and the like.

The second object of this invention is to provide an inexpensive and multipurpose tool and technique of automatically installing and removing resilient bumper insert materials into gunnel rails/rub rails already located on the sides of boats, vehicles, motorhomes, trailers and the like.

The third object of this invention is to provide a tool and technique of automatically installing and removing resilient bumper insert materials inside of gunnel rails/rub rails that does not excessively bend, mark up, scrape, dent, nor destroy the resilient bumper insert material.

The fourth object of this invention is to provide a tool and technique of automatically installing and removing resilient bumper insert materials into gunnel rails/rub rails, without marking up, scraping, denting nor destroying the gunnel rails/rub rails.

The fifth object of this invention is to provide a tool and technique of automatically installing and removing resilient bumper insert materials into gunnel rails/rub rails, without injuring the installer.

The sixth objective of this invention is to provide a tool and technique for automatically installing and removing resilient bumper insert materials that does not require the installer to have to hold and orient the tool in difficult postions to maintain orientations. For example, the tool handle does not have to be oriented to be substantially perpendicular to the gunnel rails/rub rails.

The seventh objective of this invention is to provide a tool and technique for automatically installing and removing resilient bumper insert materials that allows the user to hold the tool in an easy to use and maintain, and safe consistent orientation when being used that follows the longitudinal direction of the gunnel rails/rub rails. The novel tool allows the user to orient the tool handle body in a parallel orientation facing over the gunnel rails/rub rails during the installation.

The eight objective of this invention is to provide a tool and technique for automatically installing and removing resilient bumper insert materials that allows the user to consistently press a portion of the tool in an easy to use and maintain, and safe consistent orientation against the gunnel rails/rub rails when being used. The novel tool allows the user to further orient the tool body in a slightly angled (tilted/inclined) orientation of approximately 30 degrees when viewed from the side as the tool is positioned adjacent to the gunnel rails/rub rails.

The ninth objective of this invention is to provide a tool and technique for automatically installing and removing resilient bumper insert materials, that uses a guide to allow the user to consistently and automatically follow the longitudinal contour of the gunnel rails/rub rails.

The tenth objective of this invention is to provide a tool and technique for automatically installing and removing resilient bumper insert materials that consistently holds and supports the tool in a consistent orientation that does not require a free-hand holding of the tool itself. Once the tool is oriented in position, the user only has to follow the running tool until the insertion is completed or until the power is turned off.

The eleventh objective of this invention is to provide a tool and technique for automatically installing and removing resilient bumper insert materials that does not require the installer to have to physically insert the strip into the gunnel rails/rub rails prior to being used.

The twelvth objective of this invention is to provide a tool and technique for automatically installing and removing resilient bumper insert materials in the form of a versatile adapter for use with existing handheld power tools such as but not limited to power drills, power screw drivers and the like.

A first embodiment of the invention includes an automated multi-purpose handheld tool for inserting resilient bumpers into the channels on gunnel rails and rub rails that are located on the sides of vehicles such as boats, motor homes and trailers. The first embodiment automatic tool can include an adapter portion that can be used as a chuck head attachment for conventional power tools such as handheld drills, power screw drivers, and the like.

The tool has a first end for a handgrip and a second end with a rotatable rollers and wheels, where the second end is laid over the front portion of the elongated resilient strip and causes the rear portion of the elongated strip to be inserted into the channels on the side of the vehicles. Each of the channels have a rear wall for being attached to the side of the vehicle, and inwardly bending lips for surrounding an opening to the channel, wherein the rear portion of the elongated resilient strip is inserted into the opening of the channel. The elongated resilient strips have a backwall forming the rear portion, the backwall having an upper edge and a lower edge, wherein the upper edge and the lower edge become compressed towards one another when being inserted within the channel and expand when the rollers of the handheld tool passes over the channel. The rotatable wheels and rollers on the second end of the handheld tool have dual rollers separated from one another, wherein the rear portion of the elongated resilient strip is compressed together by the strip passing through the dual rollers. The motor in the conventional power tool base rotates the rollers/wheels.

The user simultaneously holds the tool against the channel openings of the gunnel rails and rub rails and slides the tool against the gunnel rails/rub rails at a tilt/inclination angle of approximately 10 to approximately 45 degrees to the gunnel rails/rub rails, while operating the power drill or power device causing the strip material to be inserted into the channel openings. A guide member allows for a selected inclination/tilt angle to remain consistent so that the installer merely has to support the weight of the tool. The longitudinal handle of the tool can be maintained to be substantially parallel to the longitudinal gunnel rail.

After the tool passes over a gunnel rail/rub rail base section, portions of the strip material that have been compressed by the action of the wheels, then it expands into the inside lip portions of the gunnel rail/rub rail locking the strip material in place.

The strip material can be removed by prying up an edge of the material from the channel of the gunnel rail/rub rail, and using the tool reversing the installation steps described above.

The gunnel rails/rub rails with resilient bumpers can be used with other objects such as but not limited to tables, shelves, walls, and the like.

A second embodiment of the automated multi-purpose tool has the head portion as being built onto a power tool base.

The motor that runs the wheels/rollers can be powered by batteries or be plugged into a wall receptical, or be powered by a pneumatic power supply, and the like.

Further objects and advantages of this invention will be apparent from the following detailed description of a presently preferred embodiment which is illustrated schematically in the accompanying drawings.

DESCRIPTION OF THE PREFERRED EMBODIMENT

Before explaining the disclosed embodiments of the present invention in detail it is to be understood that the invention is not limited in its application to the details of the particular arrangements shown since the invention is capable of other embodiments. Also, the terminology used herein is for the purpose of description and not of limitation.

This invention is a Continuation-In-Part of U.S. application Ser. No. 09/976,541 filed Oct. 12, 2001, which is a Divisional Application of U.S. application Ser. No. 09/482,406, filed Jan. 12, 2000, now issued as U.S. Pat. No. 6,341,410, which claims the benefit of priority to U.S. Provisional Application Ser. No. 60/116,165 filed Jan. 15, 1999, all of which are incorporated by reference.

Figure 1A:
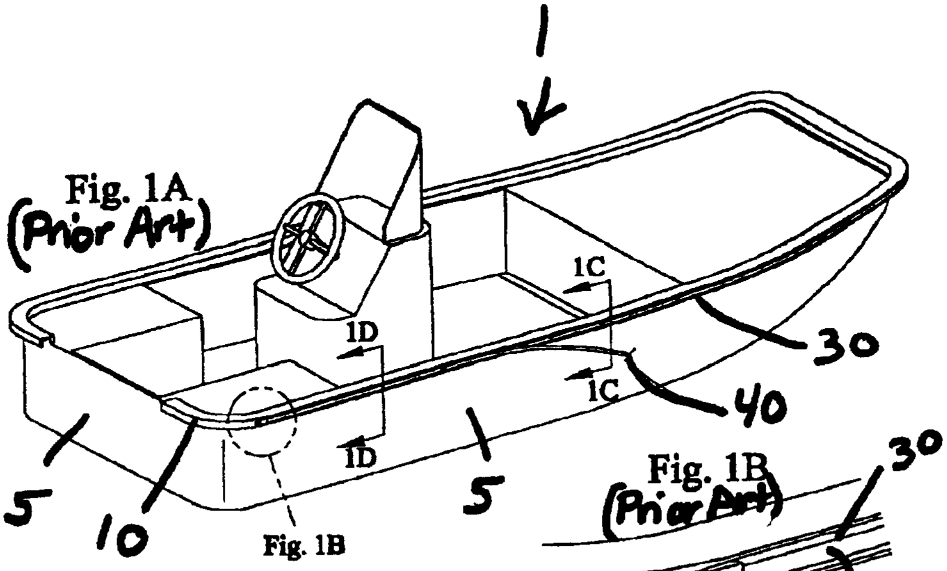
Fig. 1A (Prior Art)
FIG. 1A is a perspective view of a prior art boat having a side gunnel rail base with rub rail strip.
Figure 1B:
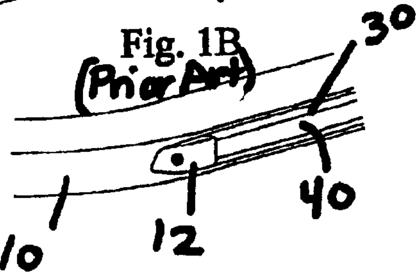
Fig. 1B (Prior Art)
FIG. 1B is an enlarged view of a portion of the side gunnel rail base with rub rail strip of FIG. 1A.
Figure 1C:
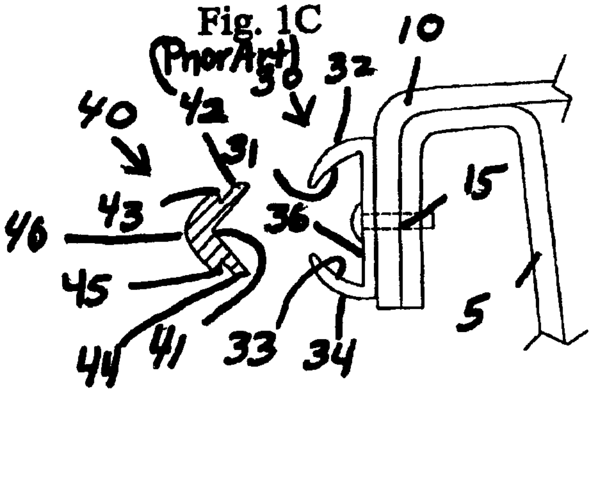
Fig. 1C (Prior Art)
FIG. 1C is a side cross-sectional view of the insert strip separated from the gunnel rail base in FIG. 1A.
Figure 1D:
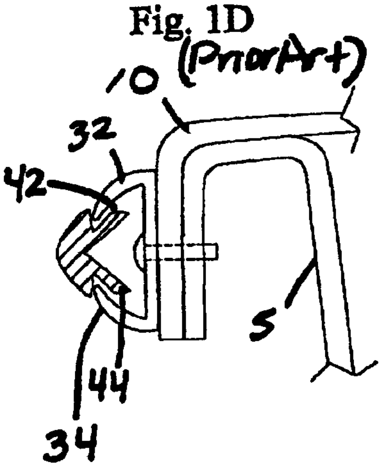
Fig. 1D (Prior Art)
FIG. 1D is a side cross-sectional view of the rub rail strip attached to the gunnel rail base in FIG. 1A.

FIG. 1A is a perspective view of a prior art boat 1 having a side gunnel rails/rub rails 30 with bumper insert strips 40 inserted therein. FIG. 1B is an enlarged view of a portion of a side gunnel rail 30 with insert strip 40 of FIG. 1A. FIG. 1C is a side cross-sectional view of the insert strip 40 separated from the gunnel rail 30 in FIG. 1A. FIG. 1D is a side cross-sectional view of the insert strip 40 attached to the gunnel rail 30 in FIG. 1A.

Referring to FIGS. 1A–1D, each gunnel rail/rub rail 30 can generally include an upper inwardly bending lip portion 32 and a lower inwardly bending portion 34 with a channel space therebetween, with rear wall 36 that is connected to a boat deck shell 10 and hull 5 by fasteners 15 with mounted end member(s) 12 at each end of the gunnel rail 30. An elongated resilient bumper strip 40 has an upper backing edge portion 42, a lower backing edge portion 44 and an outwardly facing raised tip edge portion 46, where the upper and lower backing edges 22, 44 expand within the inner spaces 31, 33 formed by upper lip portion 32 and lower lip portion 34 of each gunnel type rail. When inserted, the upper raised front edge 43, lower raised front edge 45 and tip edge portion 46 extend outside of the gunnel rail 30 of the bumper strip 40. Such a conventional deck and hull joint arrangement with bumper insert is depicted in U.S. Pat. No. 3,065,724 to Tritt, which is incorporated by reference.

Figure 2A:
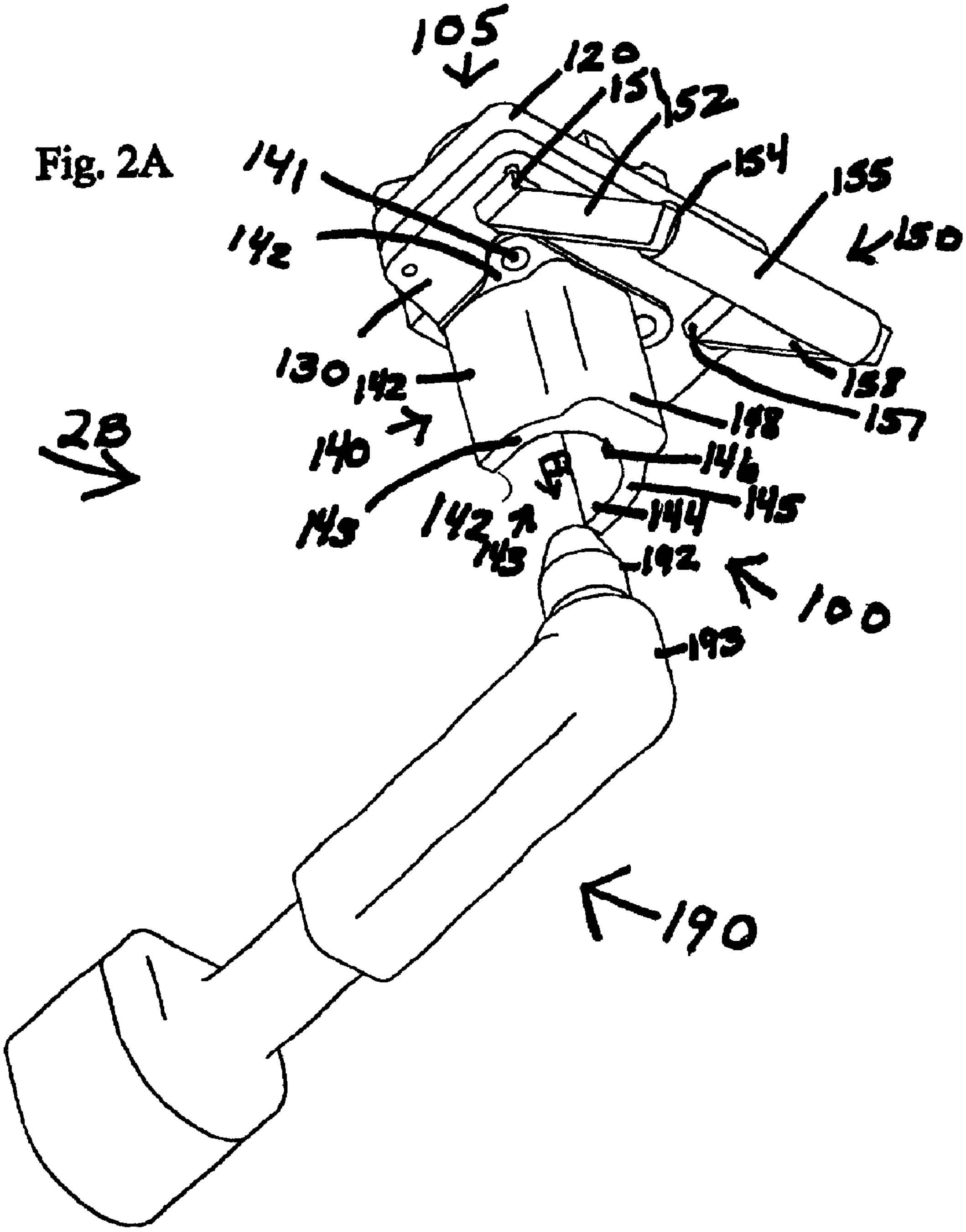
FIG. 2A is an exploded top exterior view of a first preferred embodiment of an automated multi-purpose tool with an adapter head separated from a conventional power tool base.
Figure 2B:
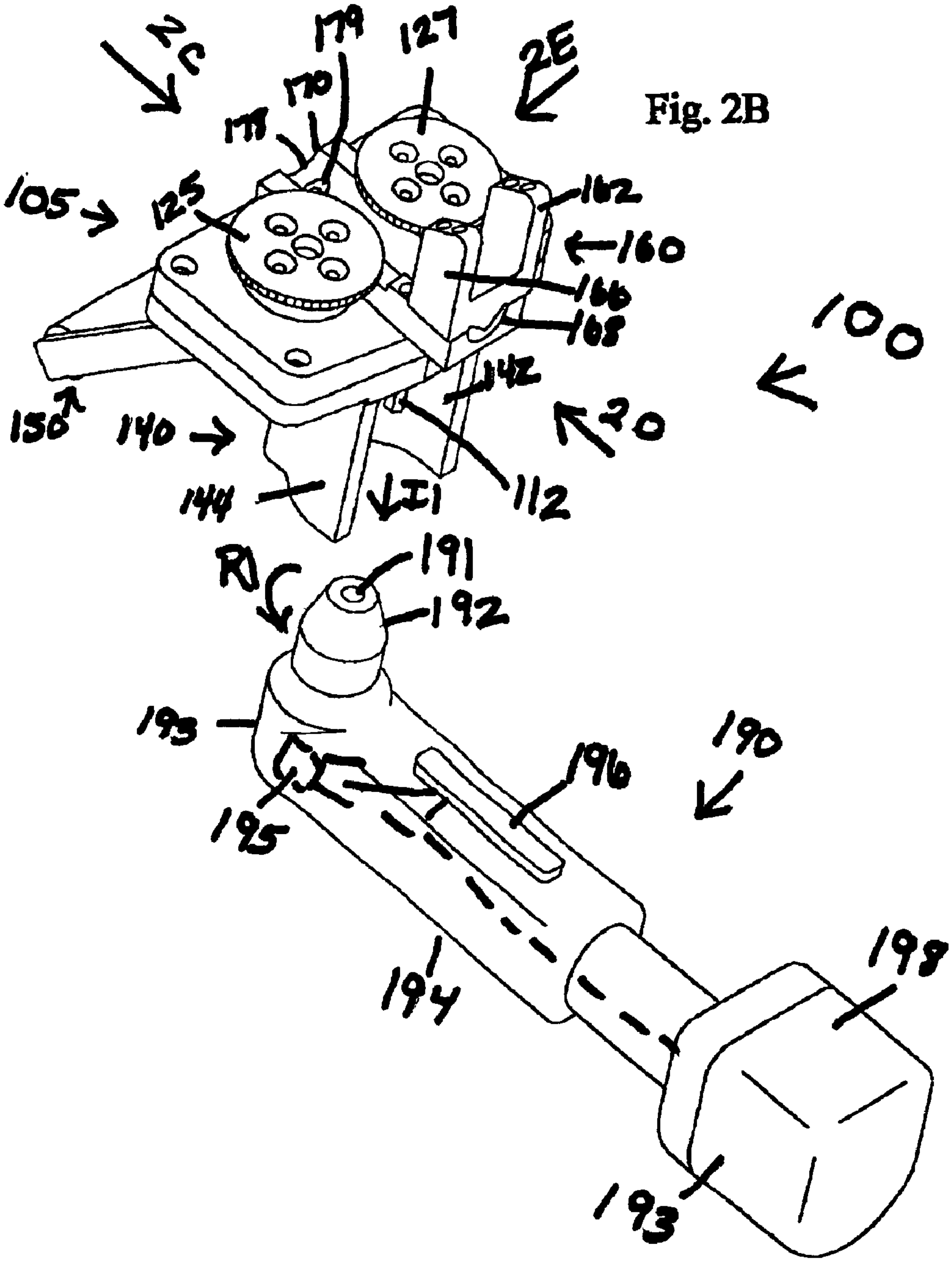
FIG. 2B is an exploded bottom exterior view of the first preferred embodiment of FIG. 2A along arrow 2B.
Figure 2C:
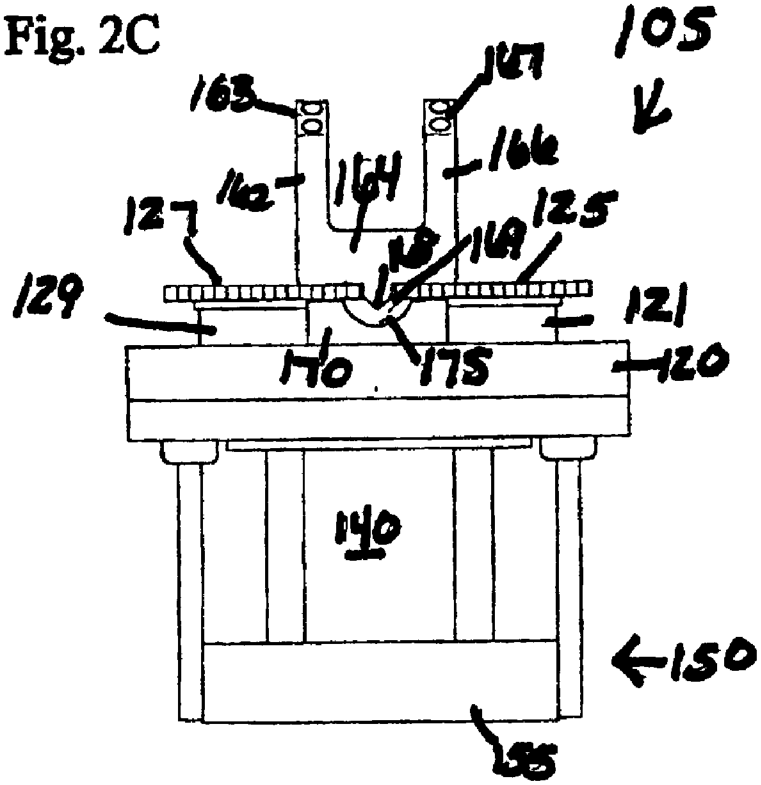
FIG. 2C is an end view of the dual rollers of the adapter head of FIG. 2B along arrow 2C.
Figure 2D:
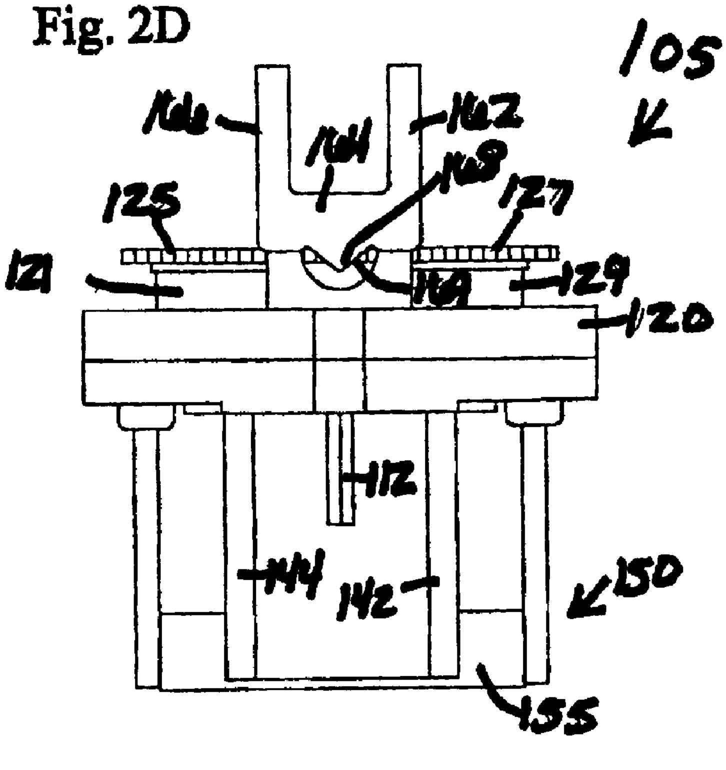
FIG. 2D is an opposite end view of the guide member of the adapter head of FIG. 2B along arrow 2D.
Figure 2E:
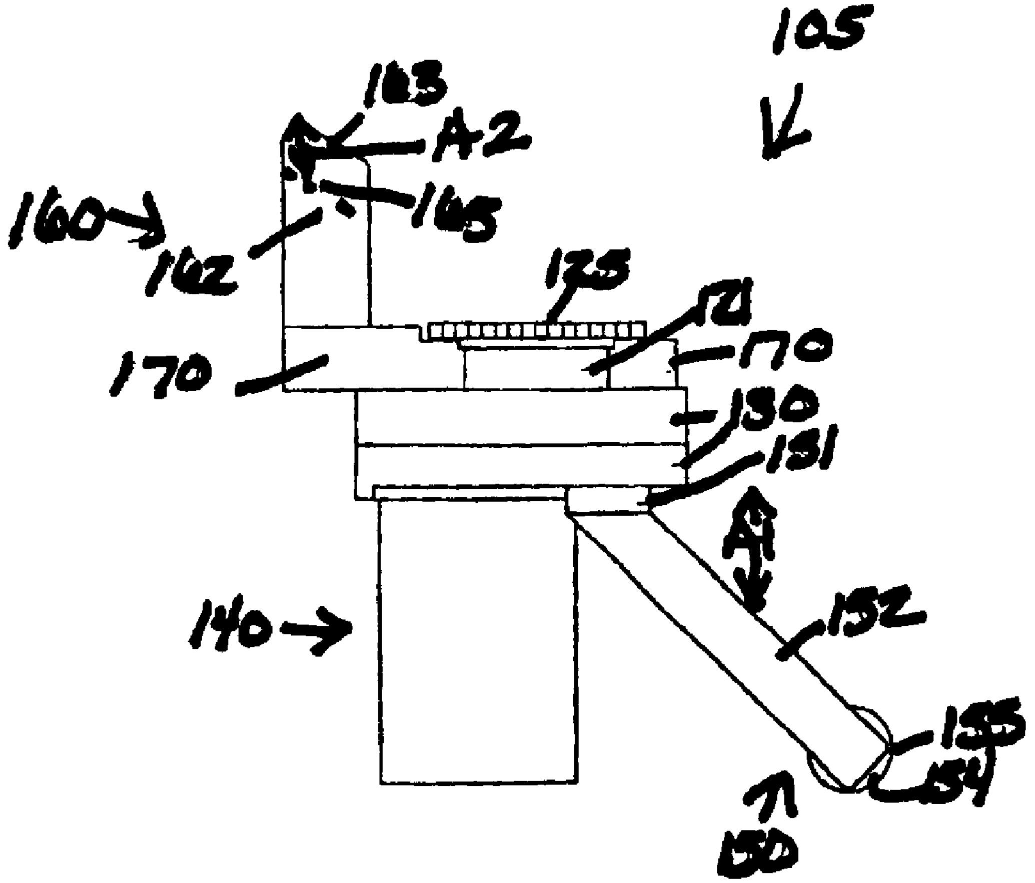
FIG. 2E is a side view of the rollers and guide member of the adapter head of FIG. 2B along arrow 2E.
Figure 2F:
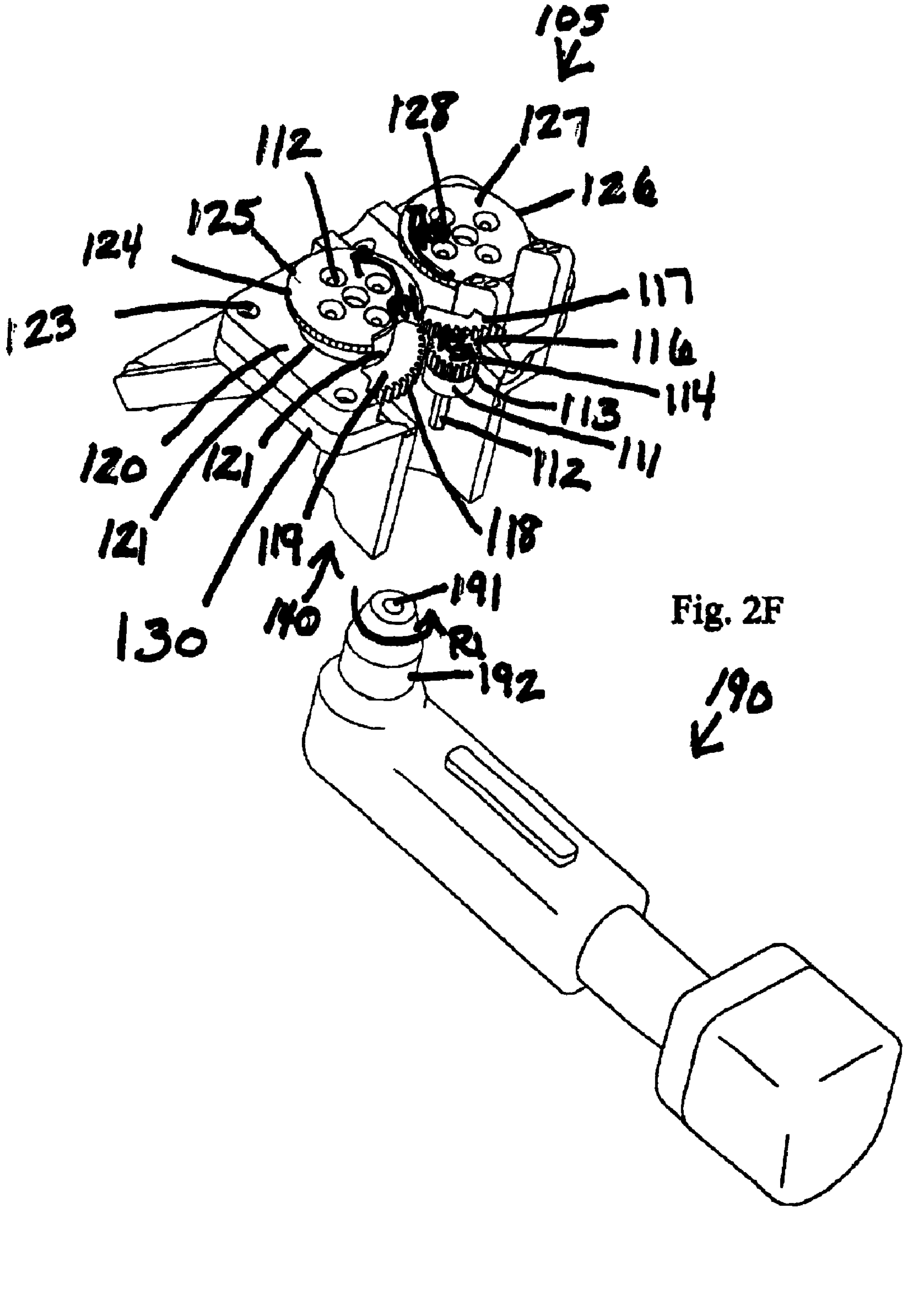
FIG. 2F is an exploded bottom view of a first preferred embodiment of a multi-purpose tool with an adapter head with interior components shown.

FIG. 2A is an exploded top exterior view of a first preferred embodiment of an automated multi-purpose tool 100 with a novel adapter head 105 separated from a conventional power tool base 190. FIG. 2B is an exploded bottom exterior view of the first preferred embodiment tool 100 of FIG. 2A along arrow 2B. FIG. 2C is an end view of the dual rollers of the adapter head 105 of FIG. 2B along arrow 2C. FIG. 2D is an opposite end view of the guide member of the adapter head 105 of FIG. 2B along arrow 2D. FIG. 2E is a side view of the rollers and guide member of the adapter head 105 of FIG. 2B along arrow 2E. FIG. 2F is an exploded bottom view of a first preferred embodiment of a multi-purpose tool 100 with the adapter head 105 having interior components partially exposed.

Referring to FIGS. 2A–2F, a first embodiment tool 100 includes a novel adapter head 105 that can be easily attachable and detachable to a conventional type power tool base 190. Such as power tool base 190 can be a conventional battery operated handheld drill, power screw driver, and the like. The conventional power tool base can include a chuck end 192 having an opening 191 which can be adjustably opened and closed to tighten about a drive shaft 112 on the novel adapter head 105, the latter of which will be described later. The chuck end 192 can be powered by a conventional motor 195 within longitudinal handle 194, which can be powered by a conventional battery pack 193 within an end detachable member 198, where a trigger type switch can be compressed to rotate the chuck end 192 in the direction of arrow R1.

Referring to FIGS. 2A–2F, the novel adapter head 105 can include a drive shaft 112, such as a hexagon shaped shaft, and the like, which protrudes from the head 105 and is attached at an opposite end to a main drive gear bearing 111 that is attached to a rotatable main gear wheel 113 having serrated teeth edges 114. The exterior serrated teeth 114 of the main gear wheel 113 interconnect with the serrated teeth 116 of right interior gear wheel 117. The serrated teeth 116 of right interior gear wheel 117 are interconnected with the serrated teeth 118 of left interior gear wheel 119. A left exterior wheel 125 is connected by a narrower base portion 121 to left interior gear wheel 119 by fasteners 128, such as screws and the like. Similarly, a right exterior wheel 127 is connected by a narrower base portion 129 to right interior gear wheel 119 by fasteners 128 such as screws, and the like. Left exterior wheel 125 can have knurled edges 124, and right exterior wheel 127 can have knurled edges 126 for allowing enhanced gripping capability about the bumper insert material 40 which will be described in further detail later. A bottom cap portion 120 has dual openings for allowing the base portions 121, 129 to pass therethrough, and bottom cap portion 120 can be fastened to an upper cap portion 130 by fasteners 123 such as but not limited to screws, and the like.

Referring to FIGS. 2A–2F, an anti-rotation bracket 140 can have a base rim portion 142 that can be attached to extend upwardly from upper cap portion 130, and can be connected to upper cap portion 130 by fasteners 141 such as screws, and the like. Bracket 140 can have an a longitudinal U-shape with an opening 143 between side flanges 142, 144 with a curved interior wall 146 allows for easy wrap around attachment of the adapter head 105 to chuck end 192 of tool base 190 when adapter head 105 is moved in the direction of arrow I1. A thickened rear wall portion 148 adds to the stability of mounting the adapter head 105 to the tool base 190. When attached the bottom ends 145 of the bracket 140 substantially wrap about the top end 193 of power tool base 190 which in effect prevents rotation of the bracket 140 and adapter head 105 relative to tool base 190.

Referring to FIGS. 2A–2F, an adapter gripping handle 150 can be attached to upper cap portion 130 by feet portions 151, 157 that are connected to legs 152, 158 that can extend at an inclined angle A1 from upper cap portion 130(FIG. 2E), where the angle can be between approximately 10 degrees to approximately 45 degrees. In a preferred embodiment that was reduced to practice, angle A1 can be approximately 27 degrees. The angle A1 can be better visualized by turning FIG. 2E upside down. Attached to legs 152, 158 can be a horizontal handle portion 154 with a gripping cover member 155 such as rubber, foam, and the like, wrapped about the handle portion 154 to enhance the user gripping the handle 150.

Referring to FIGS. 2A–2F, a guide member 160 can extend from the bottom of the adapter head 105, the guide member 160 can include posts 162, 166, having inclined bottom faces 163, 167. Faces 163, 167 can be inclined at an angle A2(FIG. 2E) which is equivalent to angle A1, described above, where inclined angles A1(2E) and A2 can each be in the range of approximately 10 degrees to approximately 45 degrees. In a preferred embodiment that was reduced to practice, angles A1 and A2 can each be approximately 27 degrees. The angle A2 can be better visualized by turning FIG. 2E upside down. Post faces 163, 167 can be formed from plastic, and the like. Alternatively, faces 163, 167 can include a material such as nylon, and the like, to aid in sliding the tool 100 over the gunnel rails which will be described later. Posts 162, 166 attach to a base portion 164 which can have a downwardly protruding triangular tip portion 168 underneath of which can be a slot opening 169 there-through which allows for a bumper insert strip 40 to be described later to pass therethrough. Underneath guide member 160 can be guide track 170 which runs between exterior wheel base portions 121, 129 having a longitudinal rounded indentation 175, where the slot opening 169 is formed where track indentation 175 is adjacent to protruding tip portion 168 of the guide member.

The operation of the rotatable components of the first embodiment will now be described in reference to FIGS. 2B and 2F. To connect the adapter head 105 to tool base 190, drive shaft 112 is inserted into opening 191 of rotatable chuck end 192 in the direction of arrow I1. Operating the tool base 190 and causing the rotating of the chuck end 192 in a counter-clockwise direction as shown by arrow R1 causes main gear wheel 114 to also rotate in a counter-clockwise direction as shown by arrow R2, which causes the right interior gear wheel 117 and exterior right wheel 127 to rotate in a clockwise direction as shown by arrow R3. Simultaneously, the clockwise rotating right interior gear wheel 117 causes the left interior gear wheel 130 and exterior wheel 125 to rotate in a counter-clockwise direction as shown by arrow R4.

Figure 3A:
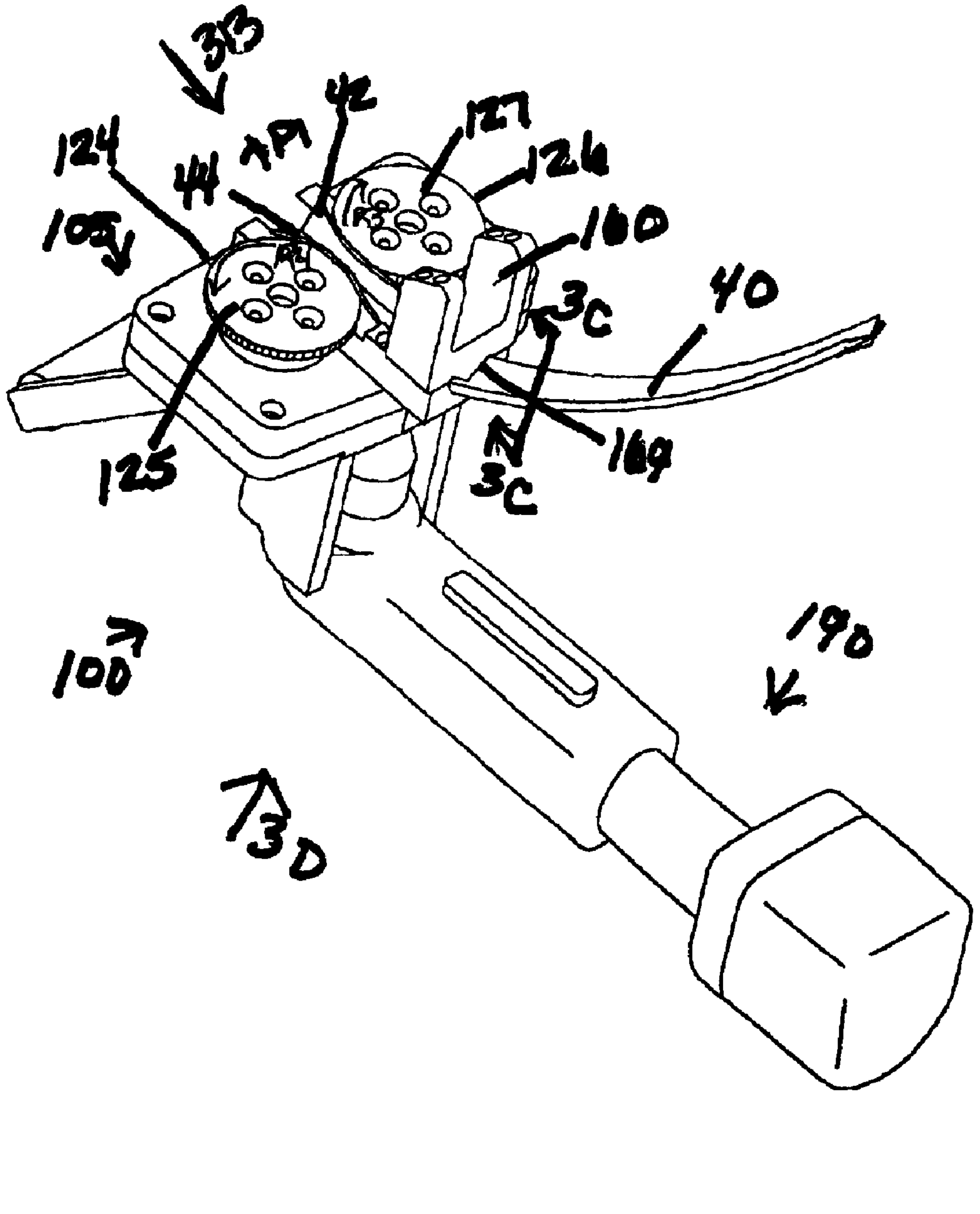
FIG. 3A is a bottom view of the first preferred embodiment with adapter head attached to the power tool base, and rub rail strip inserted within the guide member and the dual rollers.
Figure 3B:
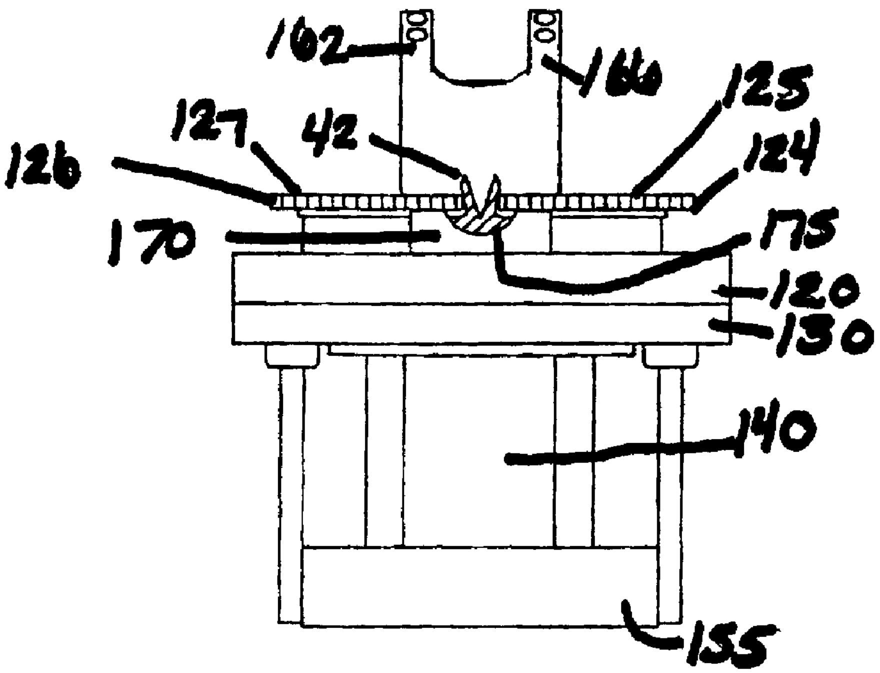
FIG. 3B is an end view of adapter head with rub rail strip between the dual rollers of FIG. 3A along arrow 3B.
Figure 3C:
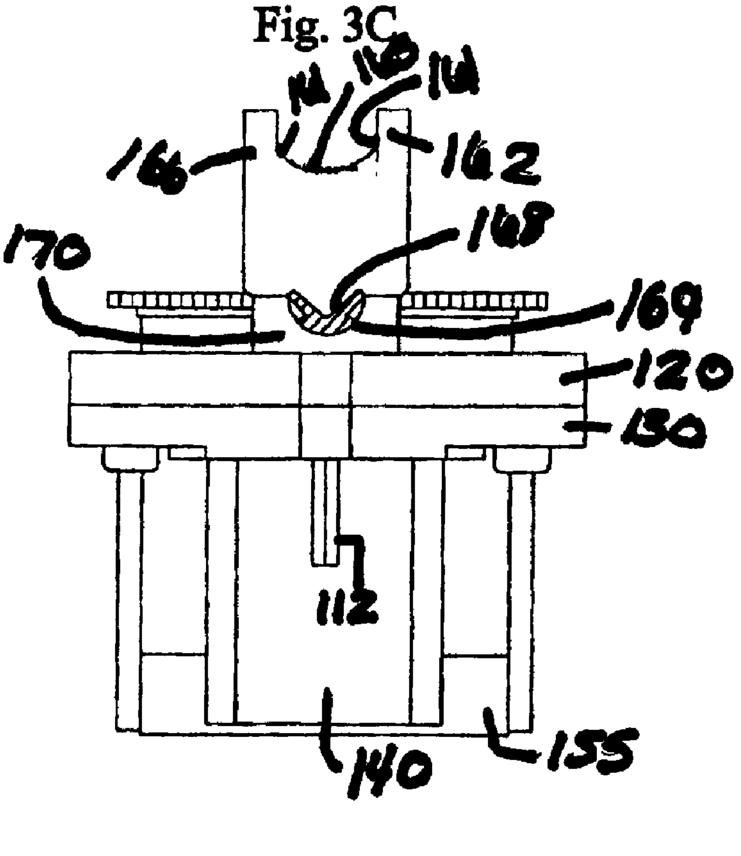
FIG. 3C is an opposite end view of the adapter head with rub rail strip within a guide member opening of FIG. 3A along arrow 3C.
Figure 3D:
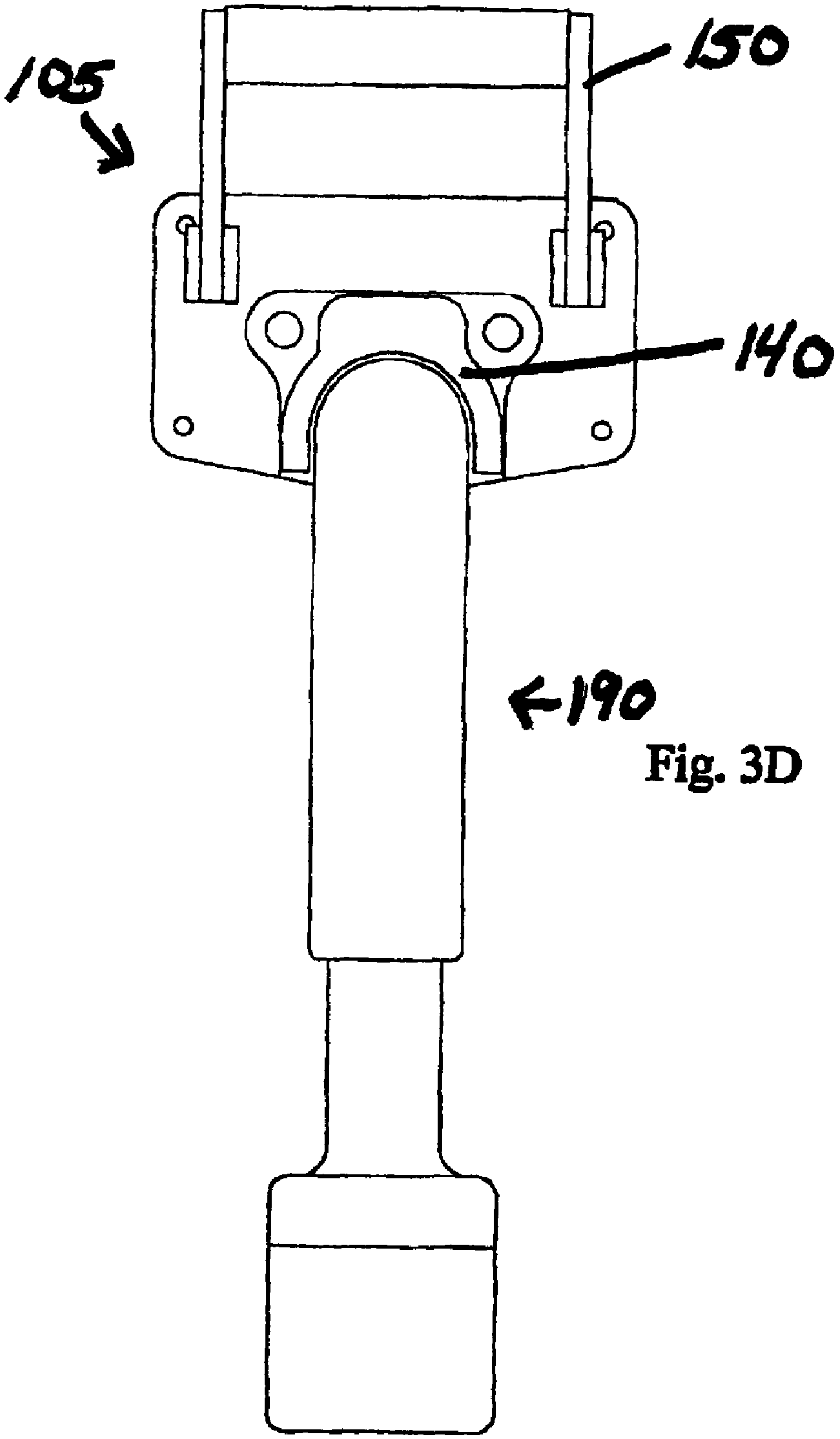
FIG. 3D is a top view of the adapter chuck head attached to the power tool base of FIG. 3A along arrow 3D.

FIG. 3A is a bottom view of the first preferred embodiment 100 with adapter chuck head 105 attached to the power tool base 190, and rub rail strip 40 inserted within the slot opening 169 of the guide member 160 and the dual exterior wheels 125, 127. FIG. 3B is an end view of adapter chuck head 105 with rub rail strip 40 between the dual wheels 125, 127 of FIG. 3A along arrow 3B. FIG. 3C is an opposite end view of the adapter chuck head 105 with rub rail strip insert 40 within a guide member slot opening 169 of FIG. 3A along arrow 3C. FIG. 3D is a top view of the adapter head 105 attached to the power tool base 190 of FIG. 3A along arrow 3D.

Referring to FIGS. 3A–3C, an installer can hand insert an end of bumper strip insert 40 into the curved slot opening 169 in guide member 160, where both the slot opening 169 along with the curved indentation 175 in guide track 170 directs the bumper insert 40 toward exterior wheels 125, 127. When the tool 100 is running, the knurled edges 124, 126 of the rotating wheels 125, 127(which can rotate in the clockwise and counter-clockwise directions as shown by arrows R3 and R4, which were previously described) aid in pulling the bumper strip 40 therethrough. As the bumper strip 40 passes through the wheels 125, 127 in the direction of arrow P1, the upper backing edge portion 42, a lower backing edge portion 44 which were previously compressed together by the knurled edges 124, 126, can now expand outward(as shown in FIG. 3A).

Figure 4:
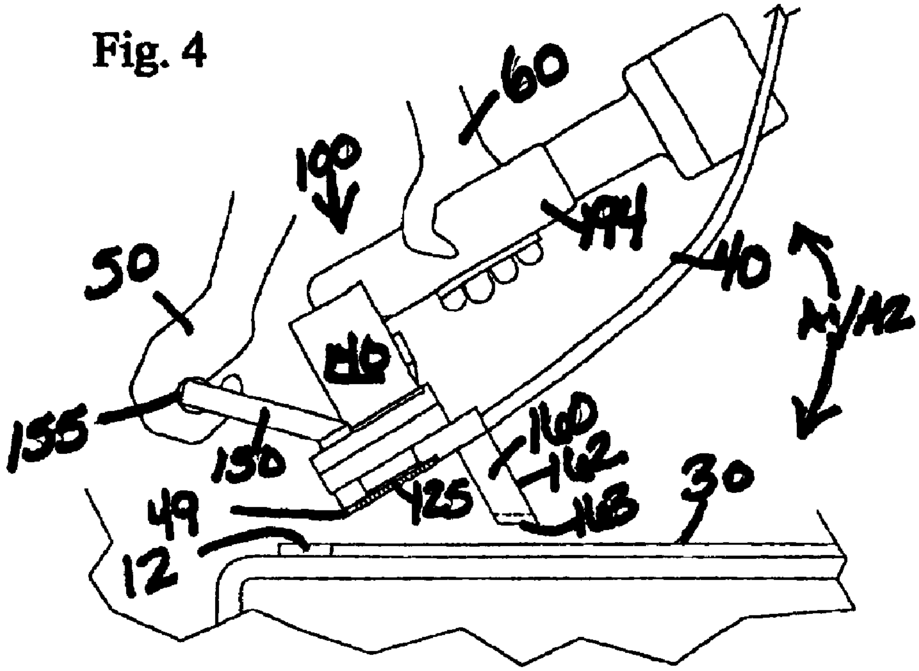
FIG. 4 is a side view of the first preferred embodiment multi-purpose tool with inserted rub rail strip of FIGS. 3A–3C separate from and ready to install the rub rail insert strip into a gunnel rail base.

FIG. 4 is a side view of the first preferred embodiment multi-purpose tool 100 with inserted rub rail insert strip 40 of FIGS. 3A–3C separate from and ready to install the rub rail insert strip 40 into the channel within the surface mounted gunnel rail 30(such as the boat mounted side gunnel rail 30 previously described in reference to FIGS. 1A–1C. Referring to FIG. 4, the tool 100 can be simultaneously supported and held by a left hand 50 of a user about handle portion 155 of gripping handle 150, and by a right hand 60 of a user about the longitudinal housing 194 of tool base 190 with the entire tool body oriented at an angle A1/A2. As previously described angles A1/A2 can be between approximately 10 degrees and approximately 45 degrees for maximum ease for using the tool 100. A working prototype of the invention was reduced to practice using an inclination angle A1/A2 of approximately 27 degrees. A trailing edge portion of the tool 100 where the bottom most inclined edge of wheel 125 is lowered in the direction of arrow L1 to be adjacent to mounted end member 12 of the channel 30 in order to allow a bumper insert end 49 which extrudes out from the wheels (125 is only shown) in the direction of arrow P1 to be inserted into the channel opening within gunnel rail 30.

Figure 5A:
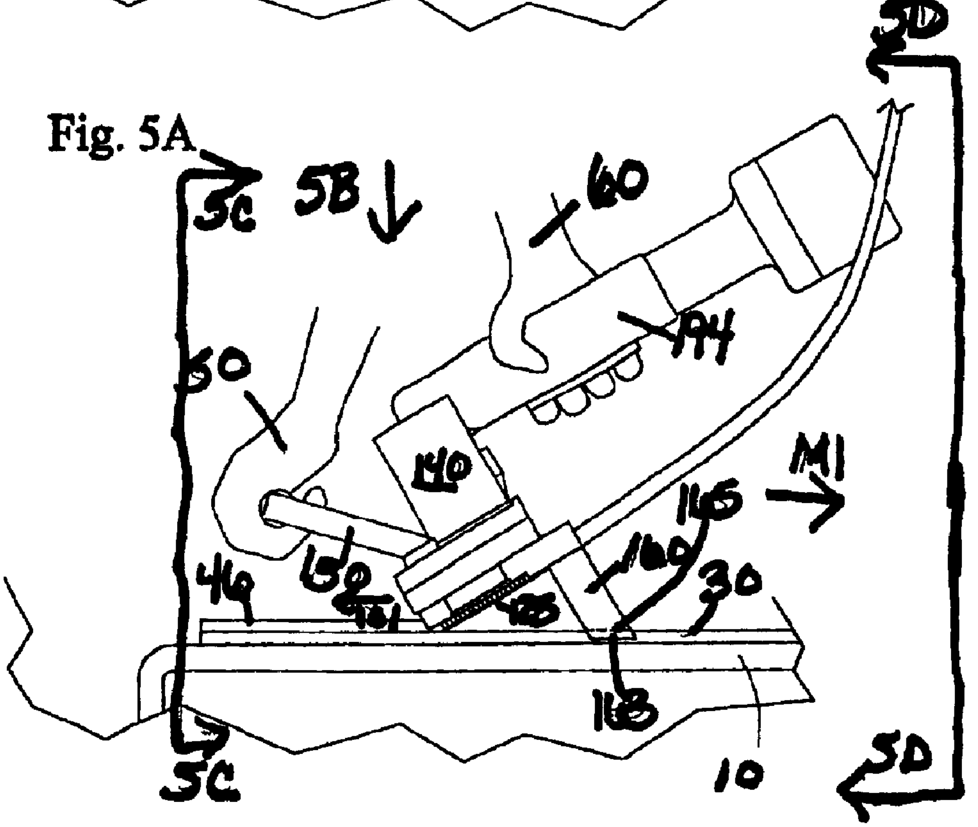
FIG. 5A is another side view of the tool of FIG. 4 with strip being inserted into the gunnel rail base.

FIG. 5A is another side view of the tool of FIG. 4 after the tool 100 has been lowered and the tool 100 is moving in the direction of arrow M1 and is inserting the bumper strip 40 into the gunnel rail 30. After installation, the raised tip edge portion 46 of the bumper insert 40 remains exposed above the gunnel rail 30. The inclined bottom faces 163(only one is shown) of the guide posts 162 of the guide member 160 are short enough to not contact any part of the deck shell 10.

Figure 5B:
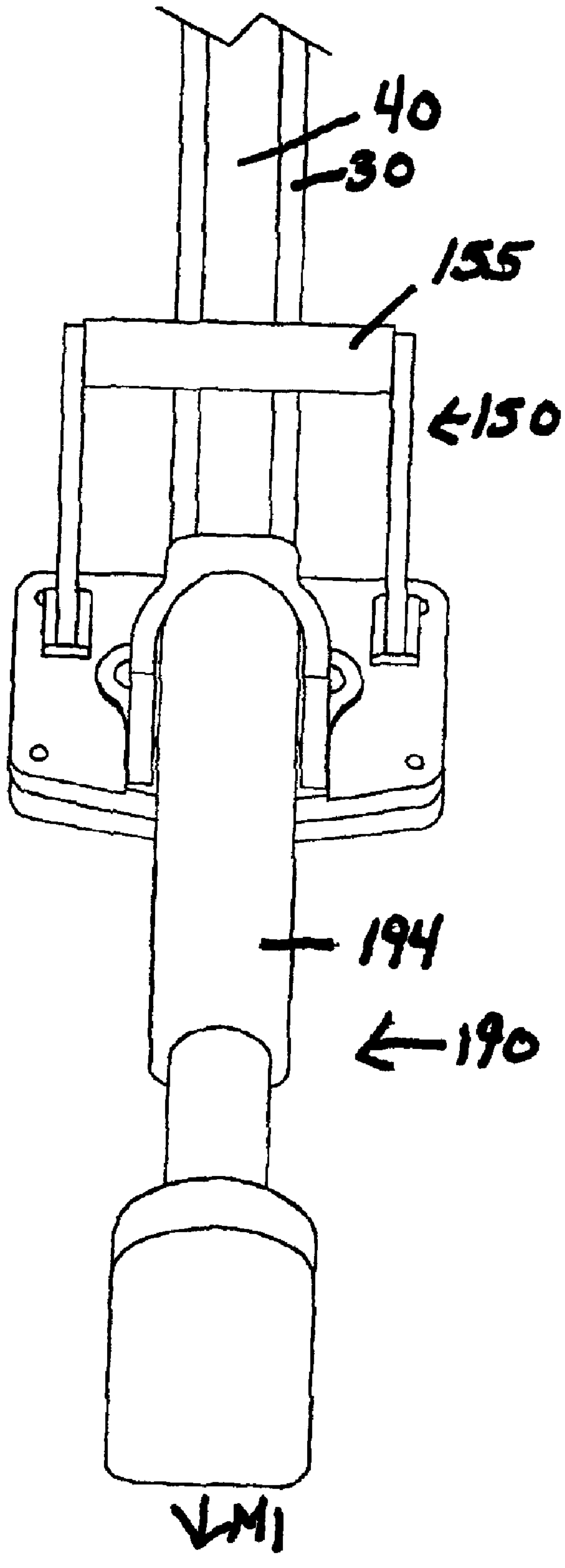
FIG. 5B is a top view of the tool of FIG. 5A along arrow 5B inserting the strip into the gunnel rail base.

FIG. 5B is a top view of the tool of FIG. 5A along arrow 5B further showing the bumper strip 40 having been inserted into the gunnel rail 30. The hands of the installer have been removed for showing clarity. Here it is clear that the longitudinal body 194 of the tool base 190 while being inclined remains in an overlapping arrangement that is not off-angle in relation to the longitudinal direction of the gunnel rail 30. Unlike prior art devices previously described, tool 100 does not deviate side to side while installing the bumper insert strips 40. Referring to both FIGS. 5A and 5B, the user gripping the tool 100 maintains their hands 50, 60 in a consistent parallel position in relation to the gunnel rail 30 as the tool is moving in the direction of arrow M1 over the gunnel rail 30.

Figure 5C:
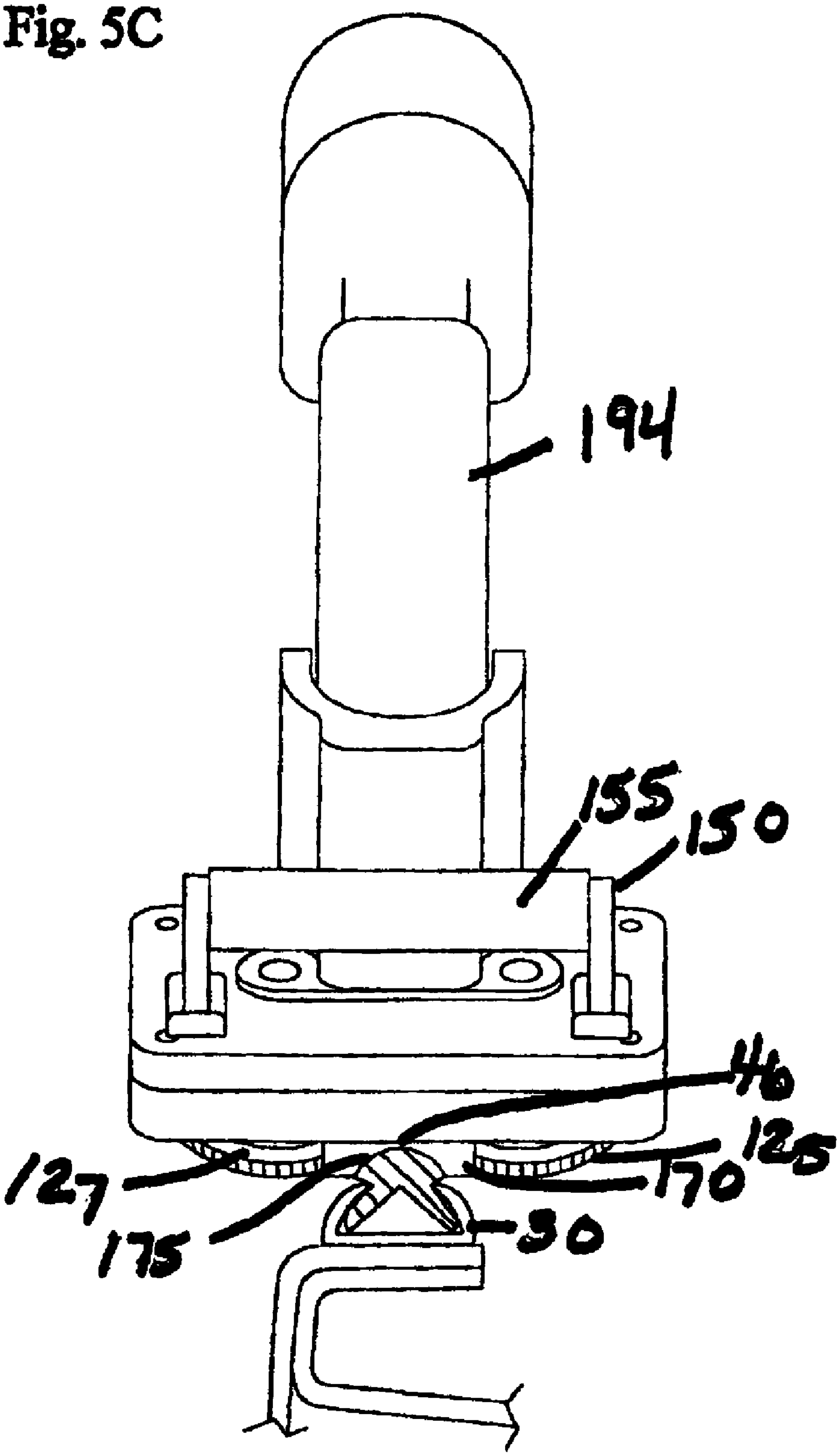
FIG. 5C is a trailing end view of the tool of FIG. 5A along arrows 5C inserting the strip into the gunnel rail base.

FIG. 5C is a trailing end view of the tool 100 of FIG. 5A along arrows 5C inserting the strip 40 into the gunnel rail 30. As the bumper strip 40 is being inserted, the raised tip edge portion 46 of the bumper insert 40 while being extruded out from the tool 100 can continuously keep this portion of the tool 100(such as the wheels 125, 127, and guide track 170) from physically contacting the gunnel rail 30 directly, thus eliminating any scratches and scrapes that can damage the gunnel rail 30, that often can occur with prior art methods and devices previously described.

Figure 5D:
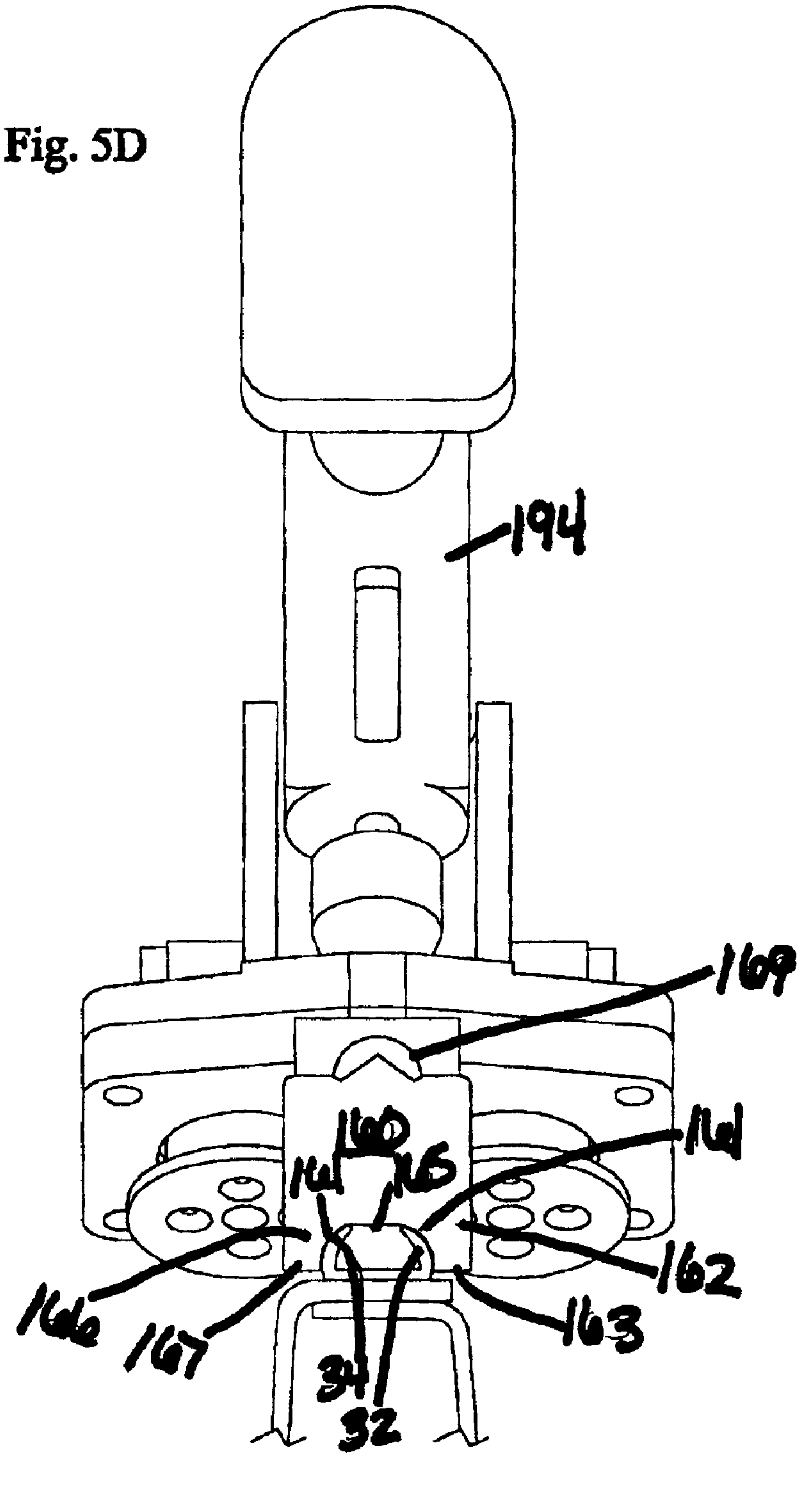
FIG. 5D is a leading end view of the tool of FIG. 5A along arrows 5D inserting the strip into the gunnel rail base.

FIG. 5D is a leading end view of the tool 100 of FIG. 5A along arrows 5D inserting the strip into the gunnel rail 30. Here, the interior roof portion 165 and inwardly curved upper inside wall surfaces 161 of the guide posts 162, 166 can rest on and can hug against the upper exterior portions of inwardly bending lip portions 32, 34 of gunnel rail base 30. As previously described using a plastic type guide member 30 would allow for the guide posts 162, 166 to slide over the gunnel rail lip portions 32, 34. Furthermore, using short posts 162, 166 with bottom inclined faces 163, 167 that do not have to directly contact any other surface 10 of the boat, reduces any damage to the boat surface 10 that can occur with the prior art methods and devices previously described.

Referring to FIGS. 2E, 3A, 3B, and 5A–5D, the guide member 160 can have an interior roof portion 165 along inwardly curving side walls 161 which together can be sized to conform about the exterior curved surfaces of the upper lip portion 32 and lower lip portion 34 of gunnel rail base 30 so that the guide member 160 with posts 162, 166 is raised above deck hull 10. The grooved out indentation of roof portion 165 and inwardly curved walls 161, formed between posts 162, 166 can have a continuous inclined angle A2 of approximately 10 to approximately 45 degrees, so that the roof portion 165 and inwardly curved walls 161 keep the guide member 160 and tool 100 at a continuous inclined angle of A1/A2. The posts 162 and 166 wrapping down along the upper sides of upper lip portion 32 and lower lip portion 34 of the gunnel rail base 30 can prevent the tool 100 from moving side to side as it travels over the gunnel rail base 30.

The subject invention can allow an installer to merely support the weight of the tool 100 when the strip insert material 40 is being automatically inserted by the motorized wheels into the gunnel rail base 30, since the guide member 130 can help fix a consistent selected inclined angle for the tool 100, and the guide member posts 162, 166 can help keep the tool 100 from easily shifting side to side when being used. The longitudinal handle portion 194 of the tool can be maintained to substantially overlap the longitudinal length of the rail base 30, with the user's hands 50, 60 consistently moving substantially parallel to the moving direction M1 of the tool 100(FIG. 5A).

Figure 6A:
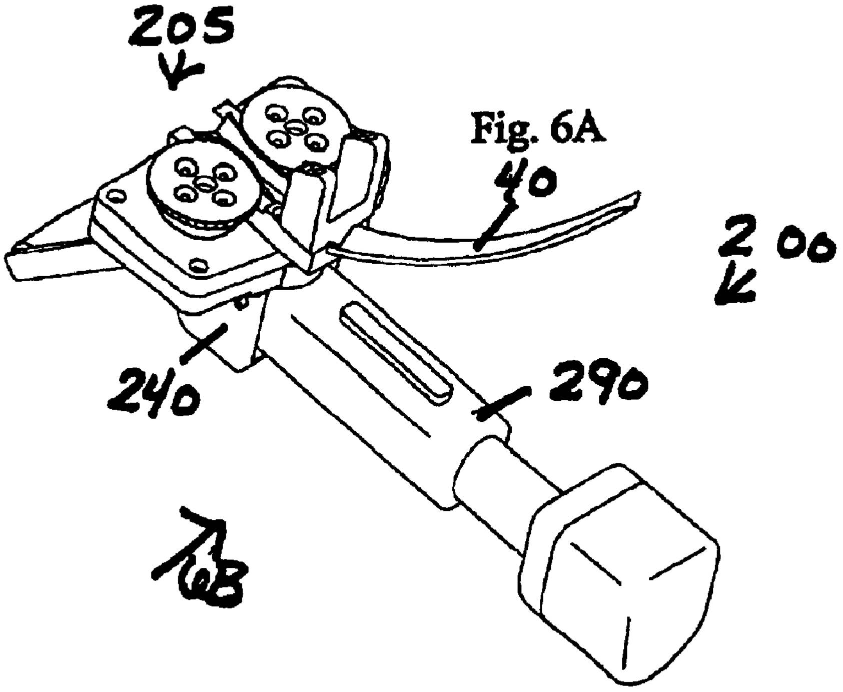
FIG. 6A is a perspective bottom view of a second preferred embodiment automatic multi-purpose tool.
Figure 6B:
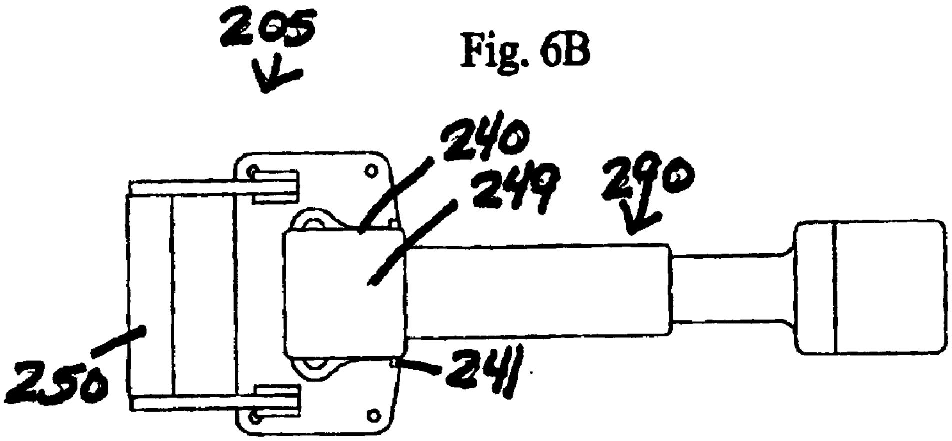
FIG. 6B is a perspective top view of the tool of FIG. 6A along arrow 6B.
Figure 7:
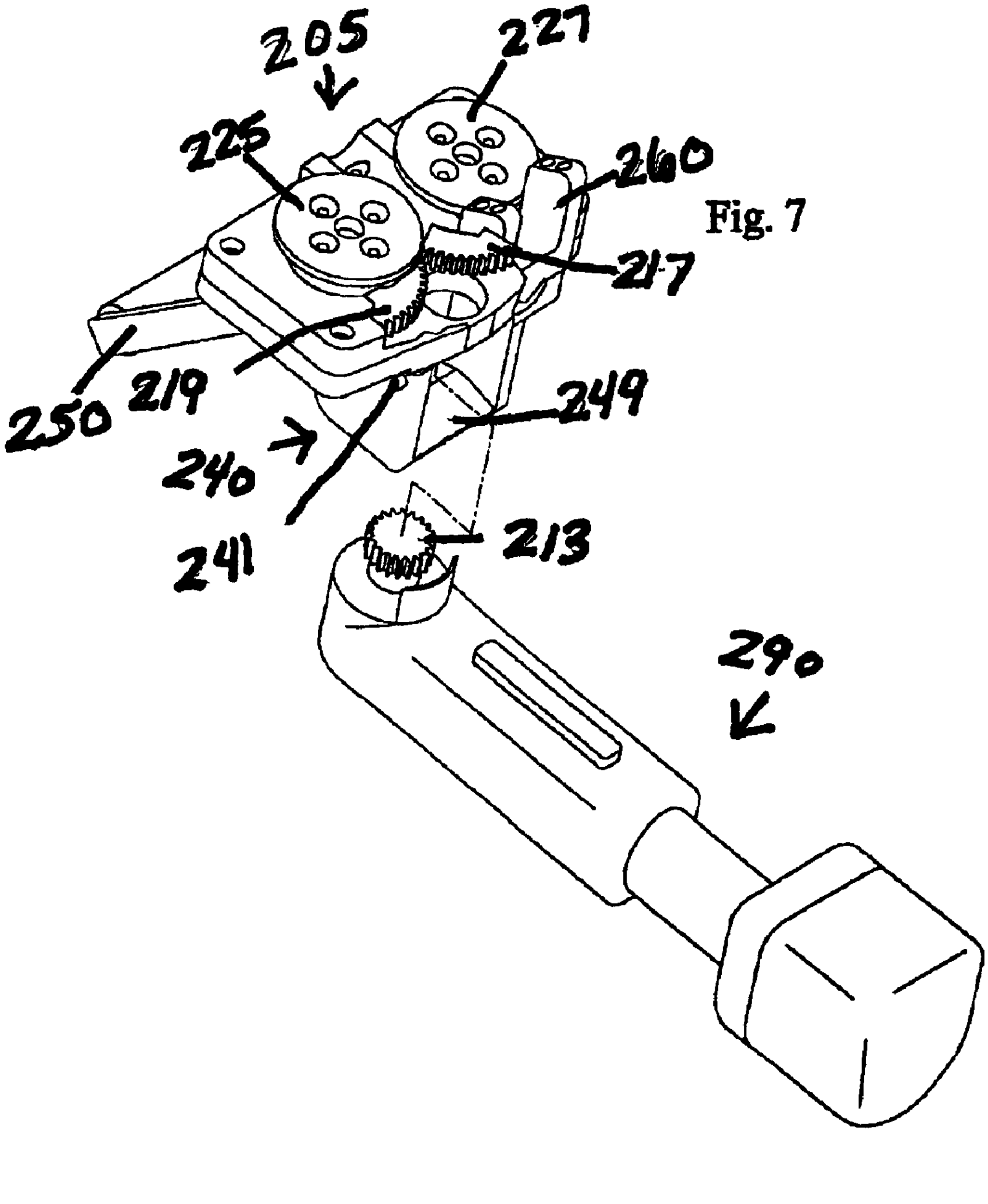
FIG. 7 is an exploded bottom perspective view of the tool of FIGS. 6A–6B with chuck head detached from tool base with interior components visible.

FIG. 6A is a perspective bottom view of a second preferred embodiment automatic multipurpose tool 200. FIG. 6B is a perspective top view of the tool 200 of FIG. 6A along arrow 6B. FIG. 7 is an exploded bottom perspective view of the tool 200 of FIGS. 6A–6B with chuck head portion 205 detached from tool base 290 with interior components visible.

Referring to FIGS. 6A, 6B and 7, the second embodiment 200 shows a fixed type automatic multi-purpose tool 200 where the tool base portion 290 is generally not intended to be removed from the head portion 205. Here the anti-rotation bracket 240 is similar to the anti-rotation bracket 240 of the previous embodiment except that a bottom wall portion 249 is included which restricts the head portion 205 from being easily detachable from the tool base portion 190, and a locking fastener 241 such as a screw, and the like, can further fixably attach the head portion 205 to the tool base portion 290. The remaining components shown such as handle 250, guide member 260, and wheels 213, 217, 219, 225, 227 correspond to similar arranged components in the first embodiment. The second embodiment functions and operates in an identical manner to that of the first embodiment when being used.

Figure 8:
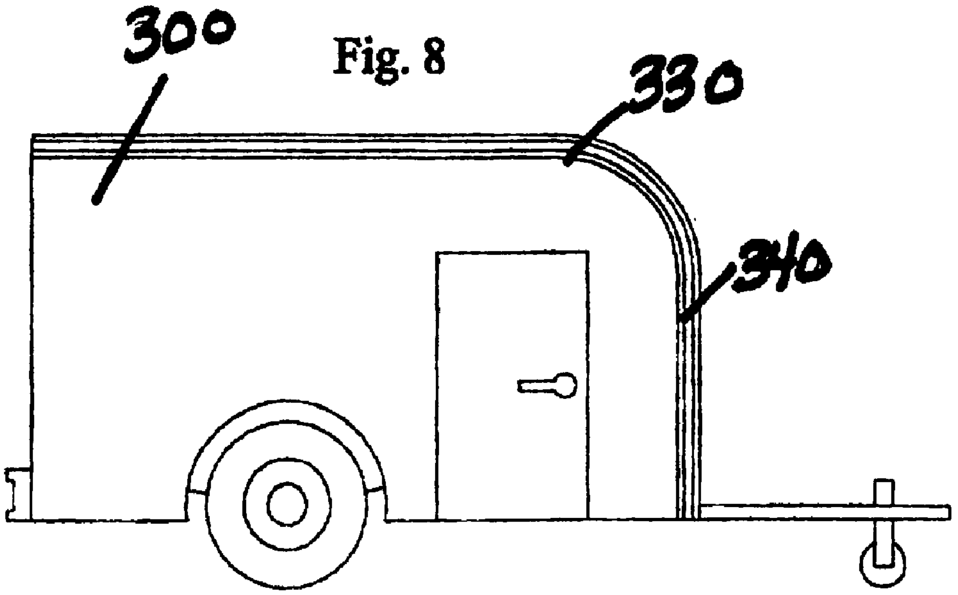
FIG. 8 is a side view of a trailer that having a rub rail strip with gunnel rail base.

FIG. 8 is a side view of a trailer 300 having a rub rail strip 340 that can be inserted into a gunnel rail 330 using the novel invention embodiments previously described.

Figure 9:
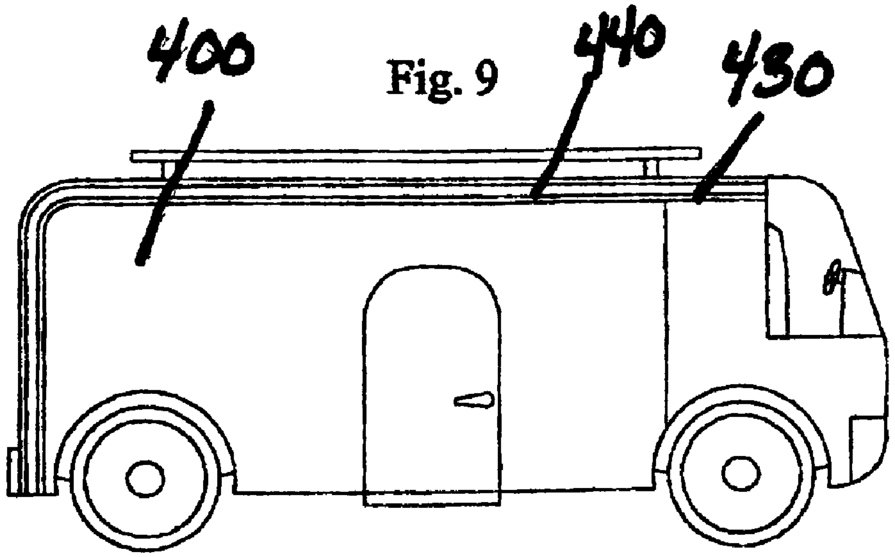
FIG. 9 is a side view of a motorhome having a rub rail strip with gunnel rail base.

FIG. 9 is a side view of a motor home 400 having a rub rail strip 440 that can be inserted into a gunnel rail 430 using the novel invention embodiments previously described.

The invention can also remove insert material when being operated in reverse.

All of the components of the novel invention described above, can be formed from various materials, such as but not limited to injection molded plastic, and the like, with the gears and wheels and drive shaft formed from either nylon, plastic, metal, combinations, thereof, and the like. For example, the novel tool embodiments can be formed from metal such as aluminum, stainless steel, galvanized metal, ferrous and nonferrous metal, and the like, plastic, combinations thereof, and the like.

Although the preferred embodiments describe using handheld motors that for rotating the wheels/rollers that can be powered by batteries, the invention can be used with other types of power supplies, such as but not limited to 120 volt type power supplies that can be plugged into a wall recepticals, and/or be pneumatically driven, and the like.

Although the novel invention embodiments describe the novel tools for use with inserting strips into gunnel type rails on boats, motor homes, and trailers, the invention can be used for inserting any bumper type strips within similar gunnel rail type channels in other applications, such as limited to bumper type strips on the sides of motor vehicles such as but not limited to cars, bumper type strips used in channels on sides of tables, walls, shelves, and chairs such as but not limited to wheel chairs, and the like.

While the invention has been described, disclosed, illustrated and shown in various terms of certain embodiments or modifications which it has presumed in practice, the scope of the invention is not intended to be, nor should it be deemed to be, limited thereby and such other modifications or embodiments as may be suggested by the teachings herein are particularly reserved especially as they fall within the breadth and scope of the claims here appended.

I claim:

1. A multi-purpose handheld tool for installing resilient bumpers into channels on rails, comprising in combination:

a longitudinal rail having an outer side with a channel along the outer side, and an inner side attached to a surface;

an elongated resilient strip;

a handheld tool having a first end and a second end opposite the first end, the first end having a pair of rollers spaced apart from one another, each of the rollers having bottom ends, the bottom ends of the rollers placed about sides of the resilient strip for compressing the sides of the resilient strip between the rollers;

a user gripped longitudinal handle attached adjacent to the second end of the tool, the handle oriented to substantially overlay and be substantially parallel to the channel;

motor means for automatically rotating the pair of rollers to rotate about the resilient strip and for inserting the compressed side portions of the resilient strip to expand into the channel, the motor means being spaced apart from the handle.

2. The multi-purpose handheld tool of claim 1, wherein the bottom ends of the rollers are oriented to the channel at an inclined angle.

3. The multi-purpose handheld tool of claim 2, wherein the inclined angle of the bottom ends of the rollers is approximately 20 to approximately 45 degrees to the channel.

4. The multi-purpose handheld tool of claim 1, further comprising:

a second handle for supporting the tool, wherein the first handle and the second handle are solely used to support the weight of the tool and not to fix the orientation of the tool.

5. The multi-purpose handheld tool of claim 1, further comprising:

means attached to the tool for guiding the tool over the channel.

6. The multi-purpose handheld tool of claim 5, wherein the guiding means includes:

a guide member perpendicularly attached to and extending beneath the tool adjacent to the rollers.

7. The multi-purpose handheld tool of claim 6, wherein the guide member includes:

an indentation space that passes about a portion of the channel.

8. The multi-purpose handheld tool of claim 6, wherein the guide member includes:

a bottom edge portion having a face portion at an inclined angle.

9. The multi-purpose handheld tool of claim 8, wherein the inclined angle is:

approximately 20 degrees to approximately 45 degrees.

10. The multi-purpose handheld tool of claim 1, wherein the motor means is a separate power tool base fixably attached to the rollers.

11. The multi-purpose handheld tool of claim 1, further comprising:

a chuck head for allowing the tool to be attachable and detachable to the motor means.

12. The multi-purpose handheld tool of claim 11, wherein the motor means includes:

at least one separate power tool selected from at least one of: a power drill, and a power screw driver, wherein the chuck head allows the handheld tool to be removable from the separate power tool, and wherein the separate power tool forms the user gripped longitudinal handle of the tool.

13. A handheld tool for installing an elongated resilient strip into a longitudinal rail having a channel on an outer side and an inner side attached to a support surface, comprising in combination:

a tool body having a first end and a second end opposite the first end, the first end having a pair of wheels spaced apart from one another, each of the wheels having bottom ends, the bottom ends of the wheels placed about sides of the elongated resilient strip for compressing the sides of the resilient strip between the wheels; and a separate power tool with a motor attached to the second end of the tool body, the separate power tool having a user gripped longitudinal handle, the handle oriented to substantially overlay and be substantially parallel to the channel of the longitudinal rail, wherein operating the power tool automatically rotates the pair of wheels to rotate about the resilient strip for inserting the compressed side portions of the resilient strip to expand into the longitudinal channel, wherein the bottom ends of the wheels are oriented to the channel at an inclined angle of approximately 20 to approximately 45 degrees to the channel.

14. The handheld tool of claim 13, further comprising:

a second handle for supporting the tool, wherein the first handle and the second handle are solely used to support the weight of the tool and not to fix the orientation of the tool.

15. The handheld tool of claim 13, further comprising:

a guide member perpendicularly attached to and extending beneath the tool adjacent to the wheels for guiding the tool over the channel.

16. The handheld tool of claim 15, wherein the guide member includes:

an indentation space that passes about a portion of the channel.

17. The handheld tool of claim 15, wherein the guide member includes:

a bottom edge portion having a face portion at an inclined angle of approximately 20 degrees to approximately 45 degrees.

18. A handheld tool for installing an elongated resilient strip into a longitudinal rail having a channel on an outer side and an inner side attached to a support surface, comprising in combination:

a tool body having a first end and a second end opposite the first end, the first end having a pair of wheels spaced apart from one another, each of the wheels having bottom ends, the bottom ends of the wheels placed about sides of the elongated resilient strip for compressing the sides of the resilient strip between the wheels; a separate power tool with a motor attached to the second end of the tool body, the separate power tool having a user gripped longitudinal handle, the handle oriented to substantially overlay and be substantially parallel to the channel of the longitudinal rail, wherein operating the power tool automatically rotates the pair of wheels to rotate about the resilient strip for inserting the compressed side portions of the resilient strip to expand into the longitudinal channel; and a guide member perpendicularly attached to and extending beneath the tool adjacent to the wheels for guiding the tool over the channel.

19. The handheld tool of claim 18, wherein the guide member includes:

an indentation space that passes about a portion of the channel.

20. The handheld tool of claim 18, wherein the guide member includes:

a bottom edge portion having a face portion at an inclined angle of approximately 20 degrees to approximately 45 degrees.

* * * * *